United States Patent
Bois et al.

(10) Patent No.: US 9,776,026 B2
(45) Date of Patent: Oct. 3, 2017

(54) DEVICE FOR LIMITING THE CONSEQUENCES OF A WIDESPREAD FIRE IN PREMISES

(75) Inventors: Dominique Bois, Manosque (FR); Mathieu Neuman, Rognes (FR); Thierry Delaforge, Pertuis (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 586 days.

(21) Appl. No.: 13/701,256

(22) PCT Filed: Jun. 1, 2011

(86) PCT No.: PCT/EP2011/059047
§ 371 (c)(1),
(2), (4) Date: Feb. 8, 2013

(87) PCT Pub. No.: WO2011/151377
PCT Pub. Date: Dec. 8, 2011

(65) Prior Publication Data
US 2013/0126195 A1    May 23, 2013

(30) Foreign Application Priority Data

Jun. 3, 2010  (FR) ...................... 10 54348

(51) Int. Cl.
*A62C 3/00*    (2006.01)
*A62C 2/00*    (2006.01)
(Continued)

(52) U.S. Cl.
CPC ................. *A62C 2/00* (2013.01); *A62C 3/00* (2013.01); *A62C 4/00* (2013.01); *B01D 46/10* (2013.01); *G21F 7/00* (2013.01); *G21F 7/015* (2013.01)

(58) Field of Classification Search
CPC .... A62C 2/00; A62C 4/00; A62C 3/00; G21F 7/00
(Continued)

(56) References Cited

U.S. PATENT DOCUMENTS 3,472,419 A * 10/1969 King .......................... 220/88.2
7,882,897 B2    2/2011 Neumann et al.
(Continued)

FOREIGN PATENT DOCUMENTS

CN    1842357 A    10/2006
CN    101084046 A    12/2007
(Continued)

OTHER PUBLICATIONS

Office Action issued Jan. 21, 2015 in Chinese Patent Application No. 2011800383910 (English language translation only).
(Continued)

*Primary Examiner* — Jason Boeckmann
(74) *Attorney, Agent, or Firm* — Oblon, McClelland, Maier & Neustadt, L.L.P.

(57) ABSTRACT

A device for limiting consequences of a fire, in a room, including a reservoir including a vessel containing a liquid, the reservoir including one or more chambers in communication with a storage cell and one or more other chambers. The reservoir also includes at least a first overflow tank and at least a second overflow tank, both integral, placed on either side of the reservoir, each tank configured to receive the liquid when the liquid exceeds a predetermined given height in the vessel.

12 Claims, 13 Drawing Sheets

(51) Int. Cl.
A62C 4/00 (2006.01)
G21F 7/00 (2006.01)
G21F 7/015 (2006.01)
B01D 46/10 (2006.01)

(58) Field of Classification Search
USPC .................................. 169/48, 66, 68, 49, 13
See application file for complete search history.

(56) References Cited

U.S. PATENT DOCUMENTS

2008/0135264 A1* 6/2008 Neumann ................ A62C 3/00
169/45
2011/0127052 A1 6/2011 Stuhlbacher et al.

FOREIGN PATENT DOCUMENTS

| | | |
|---|---|---|
| FR | 1247980 A | 12/1960 |
| FR | 2 879 471 A1 | 6/2006 |
| GB | 1165821 A | 10/1969 |

OTHER PUBLICATIONS

French Preliminary Search Report issued Jan. 12, 2011 in Patent Application No. 1054348 with English translation of categories of cited documents.
International Search Report issued Sep. 16, 2011 in PCT/EP2011/059047.

* cited by examiner

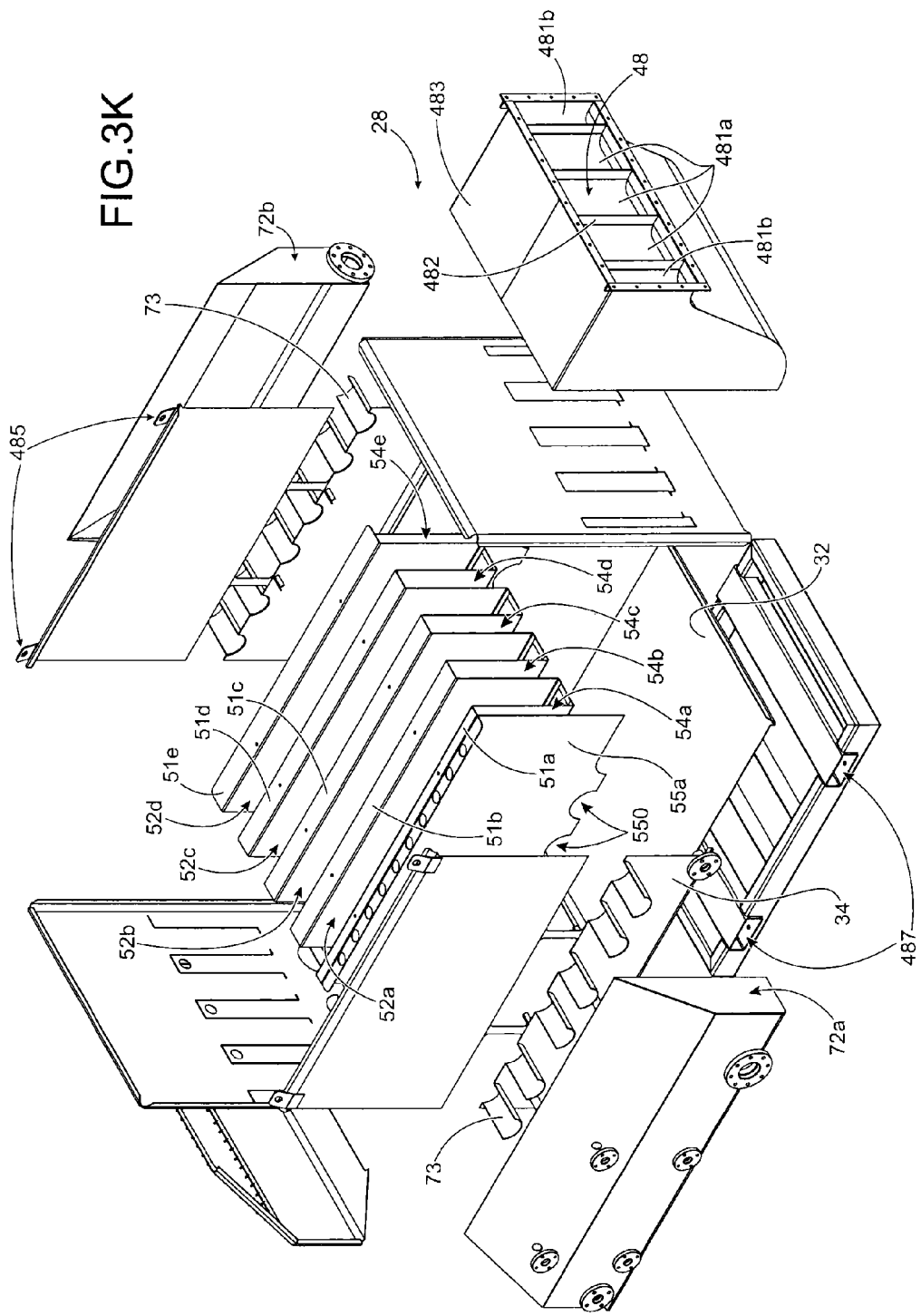

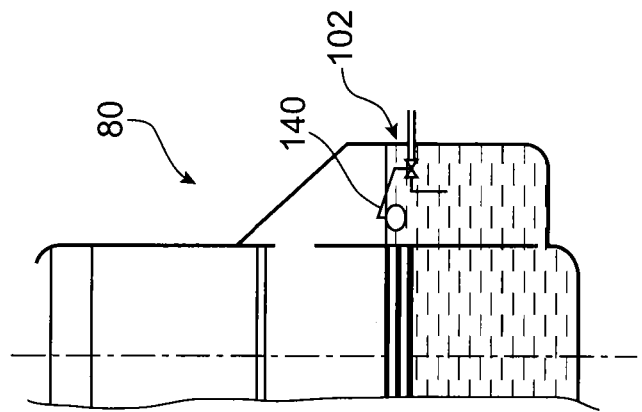
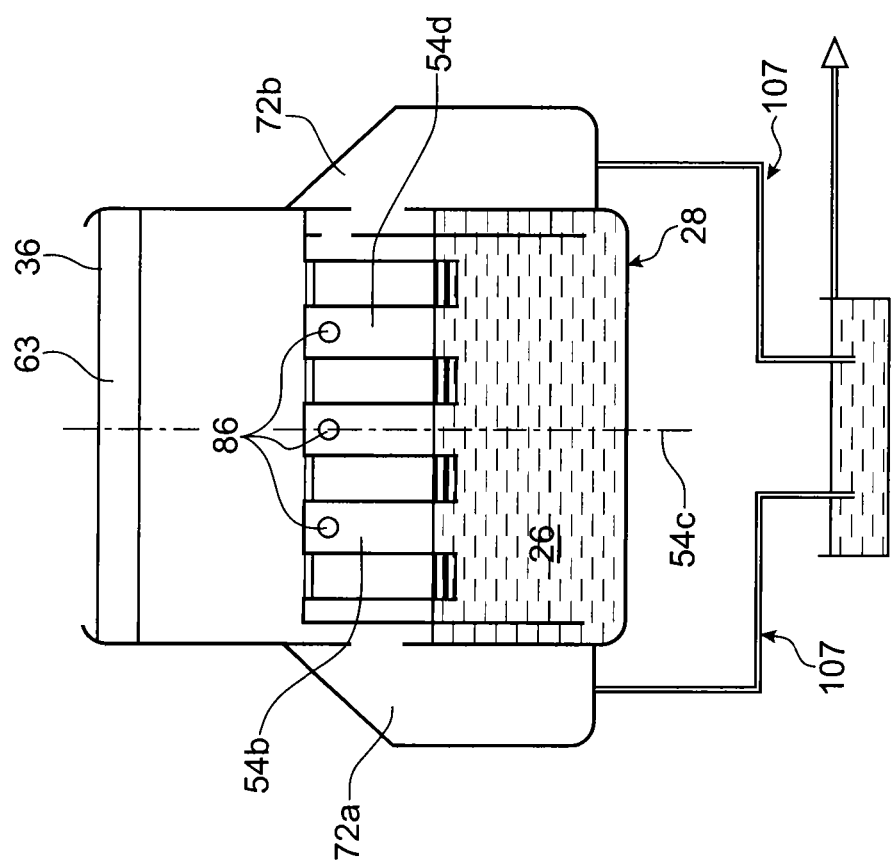
FIG.4B
FIG.4A

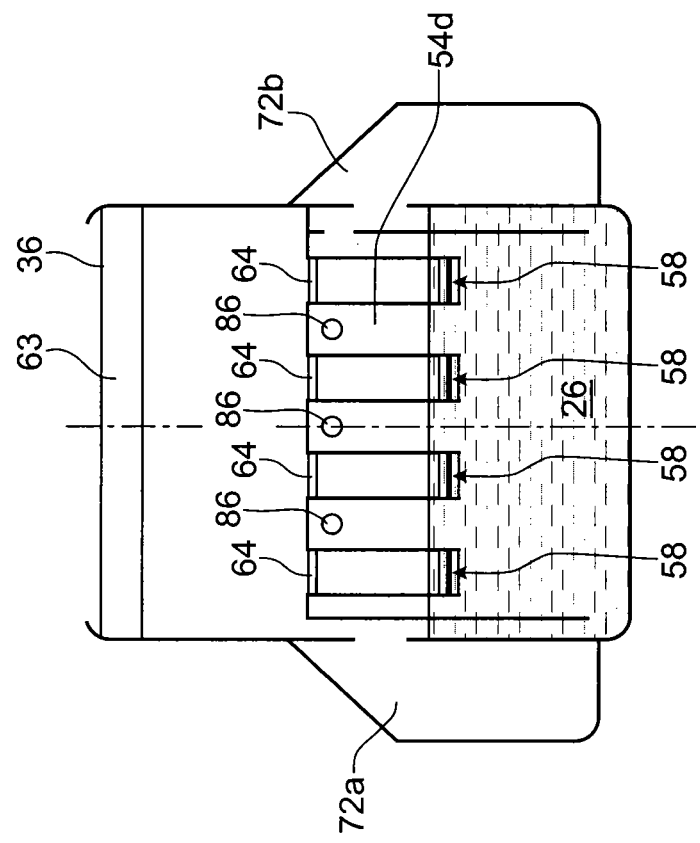
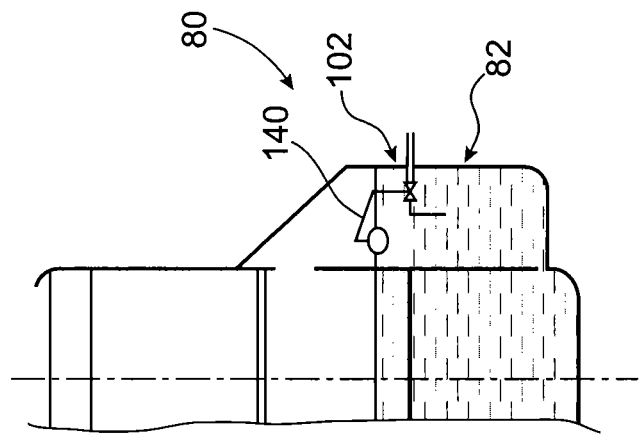
FIG.4C
FIG.4D

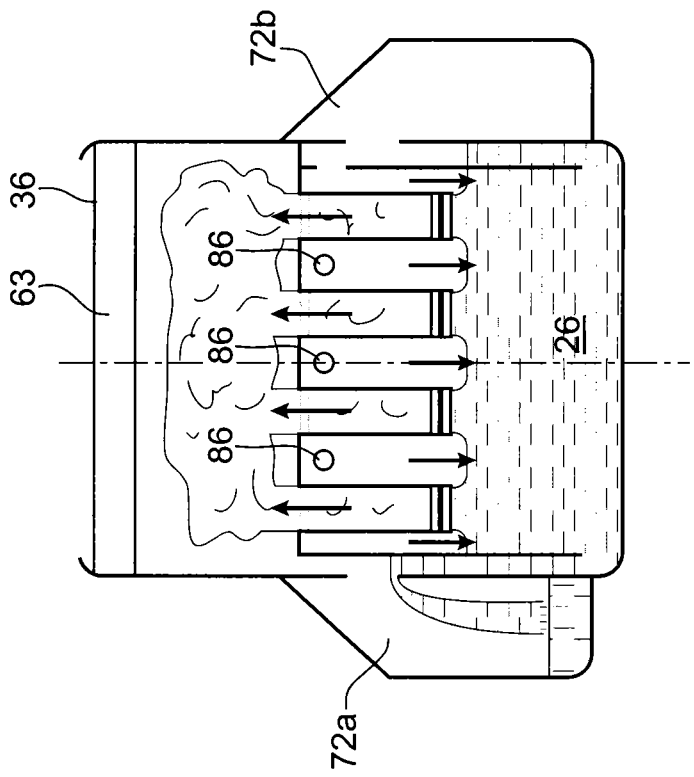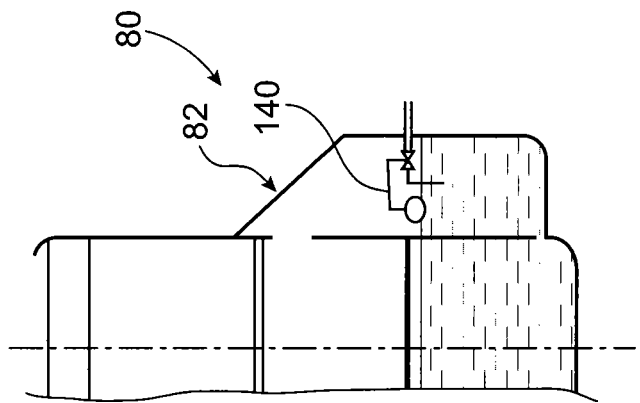

DEVICE FOR LIMITING THE CONSEQUENCES OF A WIDESPREAD FIRE IN PREMISES

TECHNICAL FIELD

The present invention relates to the field of passive devices for limiting the consequences of a fire, devices that guarantee the non-propagation of the heat or flame and the filtering of the discharged gases, and limit the phenomena of overpressure or negative pressure when a fire is declared and which may be caused by the fire itself, or by a device for extinguishing this fire, or by the failure of another apparatus.

More particularly, it concerns a device suitable for installations that must maintain the resistance of an enclosure or room to effects of overpressure or an excess of negative pressure, while guaranteeing non-propagation of the heat or flame.

PRIOR ART

In plants that hold and confine dangerous materials, the environmental protection requirements make it necessary to enclose these dangerous materials by placing them in a suitable confined room. Such a room may be in the form of a storage cell.

The environmental protection requirements make it necessary to take into account any impairment or failure of the impermeability of the cell.

In some fields, for example in the case of a nuclear material storage cell, it is usual to apply one or two supplementary protection principles, combined or not, to isolate the dangerous materials from the environment.

A first principle consists of interposing several static barriers in order to limit the consequences of the failure of one of them. The storage cell may then be implanted inside an enclosure, or more particularly a confinement enclosure, which is itself isolated from the external environment. This confinement enclosure fulfills a role of second protection barrier. The impermeability of the storage cell and that of the confinement enclosure are provided by impermeable partitions and by impermeable doors.

A second principle consists of creating a dynamic confinement system by using mechanical ventilation, which creates a negative-pressure cascade from the outside of the installation to the storage cell, in order to overcome any defects in impermeability of the static barriers. The confinement enclosure and the storage cell may each have an independent ventilation system composed of a system blowing new air coming from the outside and a system for extracting air from the cell to the outside. In addition to the confinement by keeping the rooms at risk under negative pressure, the ventilation system may also fulfill supplementary functions such as the renewal and purification of the air, by purification filters suited to the types of dangerous materials. These functions help to keep the atmosphere of the storage cell and confinement enclosure clean in order to limit the risks of transfer of the dangerous materials to the environment.

Though the two protection principles mentioned above, combined or not, are considered to be sufficient in normal operation, it is necessary to take into account accident situations such as a fire.

In some cases, analysis of the fire risks leads to taking into account an envelope scenario of a widespread and uncontrolled fire in a room with fire separation, that is to say a room the walls of which keep their integrity when they are subjected to fire.

Knowledge of fires in confined environments has made it possible to establish three successive phases of the progress of a fire, which appear on the curve in FIG. 1, which is a theoretical pressure curve of a widespread uncontrolled fire in a storage cell that holds and confines dangerous materials, and on which the x-axis corresponds to time (T) and the y-axis corresponds to pressure (P).

The first phase, designated by the reference 200 in FIG. 1 is a phase of development of the fire. This first phase 200 corresponds to a period during which the oxidant is non-limiting. In the absence of an extinguishing system in the storage cell, the thermodynamic conditions, pressure and temperature, depend on the development of the fire. From the moment of start of combustion 202, the pressure P increases from an initial negative pressure value 204 up to an overpressure peak at the maximum of the power of the fire 206. It is found that a great and rapid increase in the temperature and pressure in the storage cell, around several hundreds of degrees and several tens of thousands of pascals, is of such a nature as to call into question the integrity of the static confinement of the storage cell, its provision for isolation from the environment, in particular fire-stop shutters and filters, its fire-separation arrangements, in particular its impervious partitions and doors.

The above extreme conditions give rise to a risk of dissemination of the dangerous materials to the confinement enclosure and to the environment, and propagation of the fire to the rest of the plant. The strategies for managing the ventilation and in particular the automatic closure of the storage cell blowing system, as soon as the fire is detected, make it possible to limit the development of the fire in the storage cell since only the oxygen present is consumed by the fire. The fire is then limited by the oxidant present in the storage cell, and no longer by the fuel.

The second phase, designated by the reference 208 in FIG. 1, is a phase of suffocation of the fire. This second phase 208 corresponds to a period during which the power of the fire is limited through lack of oxidant. The suffocation of the fire causes a reduction in the temperature and therefore a great reduction in the pressure of around several thousands of pascals to negative values 216. This high negative pressure in the storage cell can also call into question the integrity of the structures already weakened by the extreme conditions of the fire. During the suffocation phase 208, once the pressure in the storage cell has become negative, a further addition of air through the damage to the structures may cause a re-inflammation and resumption of the fire.

The third phase, designated by the reference 212 in FIG. 1, is a phase of resumption of the fire. Because of the addition of oxidant described in the second phase 208, a phenomenon of resumption of the fire in the storage cell may occur. The result is then further cycles of extinction and re-inflammation between the overpressure peaks on re-inflammation 214 and negative pressure peaks on extinction 216, which correspond to pressure and temperature rises and therefore to possible releases to the environment. However, the thermodynamic conditions of a new fire cycle are less extreme than during the first phase 200, since the quantity of oxygen present in the storage cell, resulting from the damage caused by the previous phases, is less great than during the first phase 200.

In some cases, fixed extinguishing systems, for example of the gas type, are liable to create, by expansion in the storage cell, an overpressure capable of impairing the performance of the elements participating in the static barrier.

In other cases, a fire may cause rupture of a container under pressure, putting in danger the elements participating in the static barrier in the same way as in the previous cases.

It is thus sought to install a device that passively limits the risk of direct transfer from the storage cell to its external environment through damage to the isolation devices of the storage cell, and which prevents any propagation of flame from the storage cell to its external environment.

It is sought to install such a device that also limits the pressure values and cools the gases. Such a device must meet the same constraints in terms of fire resistance as the storage cell.

The document FR 2 879 471 discloses a device for limiting the ultimate consequences of a widespread uncontrolled fire in a storage cell installed in a confinement enclosure.

This device comprises a closed reservoir containing a liquid provided with an internal chamber in direct communication with said storage cell and a bubbling chamber in direct communication with said confinement enclosure by means of at least one top opening of said reservoir, fire-resisting protection and systems for regulating liquid levels.

This device keeps an active character since it comprises several regulation systems. In addition, the features of this device mean that the gas flow rates that can be treated are limited.

It is therefore a question of finding a novel device for limiting the consequences of a fire, improved in terms of capacity for treating gas flows, having a more passive operating mode than the existing limitation device, while keeping an equivalent size.

DISCLOSURE OF THE INVENTION

The present invention concerns first of all a device for limiting the consequences of a fire in a room, such as a storage cell located in a confinement enclosure, comprising a reservoir provided with a vessel containing a liquid, said reservoir comprising one more chambers referred to as "internal chamber(s)" in communication with said storage cell and one or more other chambers in communication with said confinement enclosure, the reservoir also comprising at least a first overflow tank and at least a second overflow tank, integral both, placed on either side of the reservoir, each tank being able to receive said liquid when the latter exceeds a predetermined given height in said vessel.

Such a device limits the phenomena of overpressure and negative pressure generated when a fire breaks out in a room.

Such a device also has improved triggering reactivity.

The arrangement of the reservoir is designed so that the internal chamber or chambers communicate with one or more of said other chambers and so that a gas flow, generated in particular by the pressure phenomena following a fire, and exchanged between one or more of said internal chamber or chambers and one or more of said other chambers, is intended to pass through the liquid contained in the vessel.

This is because the overflow tanks make it possible to rely on the maximum pressure that will be reached in the room, which corresponds to the triggering threshold with the pressure drop of the system added. In other words, the overflow tanks make it possible to fix a triggering pressure threshold value independently of the gas flow to be treated and the level of liquid in the reservoir. The height of the liquid level being directly related to the variation in the pressure, the fact that the liquid is made to overflow at a defined level makes it possible to fix a triggering pressure value, whatever the flow of gas to be treated. The overflow system makes it possible to increase the overflow rate and therefore the capacity of the device to absorb an abrupt variation in the liquid level, corresponding to an abrupt increase in the pressure in the room.

The overflow tanks also guarantee the triggering threshold of the device, when a malfunctioning of the liquid supply system, such as a leak, appears. This is because the surplus liquid is recovered in these tanks.

The advantage of this system is to not depend on the speed of flow of the surface liquid in a flow circuit, limited by the diameter of the pipes. The end consequence of this function of recovery by overflow in the tanks is not to slow down the whole of the process of pressure limitation in the room.

The presence of the overflow tanks makes it possible to simplify the liquid-supply circuit and to make it more passive, by dispensing with at least one regulation system.

The overflow tanks associated with a simplified water-supply circuit improve the reliability of functioning of the device and makes it more reactive.

The liquid used may be water.

Said chambers in communication with the confinement enclosure may comprise one or more so-called "bubbling" chambers.

The bubbling chambers communicate with a so-called "retardation" chamber situated in a top part of the reservoir and communicating with the confinement enclosure by means of one or more openings.

The bubbling chambers may be separated from the internal chambers by means of separation chambers being disposed orthogonally, at the bottom of the reservoir, said separation elements being equipped with wave-breaker devices formed by plates fixed on the bottom ends of the separation elements and which are oriented towards the inside of said at least one bubbling chamber.

The bubbling chambers can comprise a bubble splitting device.

The bubbling chambers may also comprise an anti-spatter device.

The retardation chamber, combined with a droplet catcher, a suitable bubbling chamber height and the anti-spatter devices above the bubbling chambers, is a means of limiting the splashing of liquid at the top part of the device.

According to one possibility, the device for limiting the consequences of a fire may also comprise channels able to pour said liquid into the overflow tanks when the level of the latter reaches the given height along the overflow tanks.

The device for limiting the consequences of a fire and limiting the pressure or negative pressure in a room may also comprise separation walls situated on either side of all the bubbling chambers and internal chambers, each of said separation walls being immersed in the liquid and being situated between the internal chamber and an inlet of the first overflow tank.

According to one possibility, one of said walls may comprise orifices in its top part.

According to another possibility, one of said walls may comprise orifices in the top of its lateral part.

The device for limiting the consequences of a fire may also comprises a system for regulating the level of liquid in the reservoir provided with a circuit supplying the reservoir with liquid.

The regulation system may be provided with a float valve, the opening of this float valve supplying liquid to said vessel. Such a system has for example the advantage of compensating for evaporation.

The supply of liquid may be protected by a forced supply independent of the regulation system.

BRIEF DESCRIPTION OF THE DRAWINGS

The invention will be better understood from a reading of the following detailed description of the embodiments of the invention, provided by way of illustration and in no way limitatively, with reference to the accompanying drawings, in which:

FIGS. 3A-3K illustrate various views of a fire limitation device, in perspective and in cross section, FIGS. 4A-4J illustrate the various states of functioning of the device.

Identical, similar or equivalent parts of the various figures bear the same numerical references so as to facilitate passing from one figure to another.

The various parts shown in the figures are not necessarily shown to a uniform scale, in order to make the figures more legible.

DETAILED DISCLOSURE OF PARTICULAR EMBODIMENTS

Figure 2:
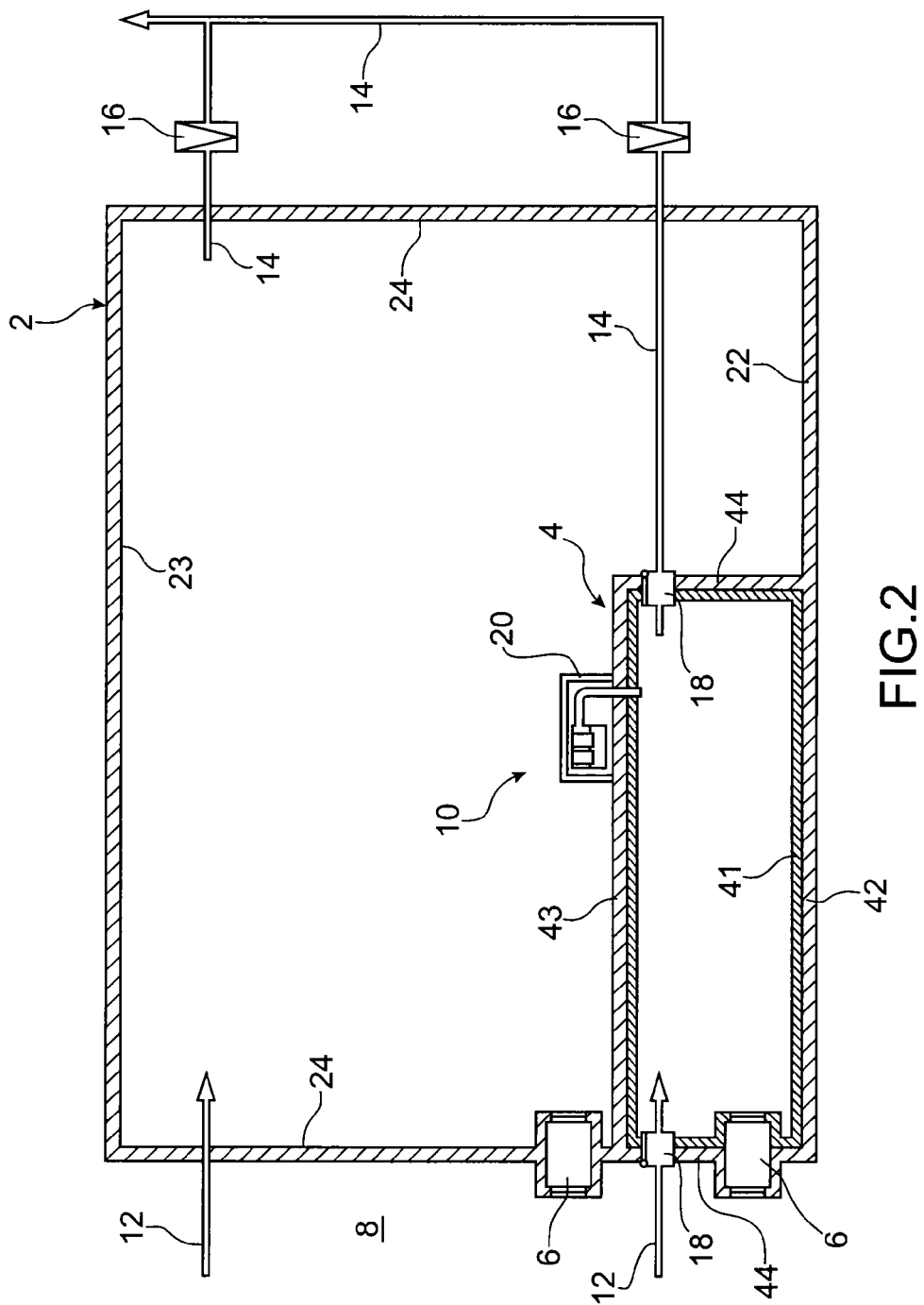
FIG. 2 illustrates an installation of a device for limiting the consequences of a fire, connected to a storage cell itself connected to a confinement enclosure.

An example of installation of a fire limitation device 10 according to the invention, which is provided in a room such as a cell for storing dangerous materials, such as for example nuclear waste, is given in FIG. 2.

This figure shows, in longitudinal section and in elevation, the storage installation, which comprises a confinement enclosure 2 in which a storage cell 4 is included. The dangerous materials are stored in the storage cell 4.

The confinement enclosure 2 may comprise a bottom partition 22, a top partition 23, and side partitions 24. The storage cell 4 is placed inside the confinement chamber 2, on the bottom partition 22 of the confinement enclosure 2. The storage cell 4 comprises a bottom partition 42 that is merged with the bottom partition 22 of the confinement chamber 2. It also comprises a top partition 43 and side partitions 44. In this example embodiment, the confinement enclosure 2 and the storage cell 4 may be provided with two common side partitions. The partitions 42, 43, 44 of the storage cell 4 may be produced for example from concrete. They are covered, inside the storage cell 4, with a fire separation cladding produced for example from plaster and/or concrete.

The bottom partition 22 of the confinement enclosure 2 may be produced for example from concrete. The top 23 and side 24 partitions of the confinement enclosure 2 may be produced for example from metal.

The partitions 22, 23, 24, 42, 43, 44 are liquidtight and gastight. Impervious air locks 6 may be provided to allow access for operating personnel to the confinement enclosure 2 and to the storage cell 4 from the outside 8 without rupture of confinement.

The confinement enclosure 2 and the storage cell 4 are both provided with a ventilation system. These ventilation systems each comprise a system 12 for blowing air coming from the outside 8, a system 14 for extracting air to the outside 8, and an air purification filter 16. The ventilation system of the storage cell 4 also comprises fire-stop shutters 18 installed on the blowing and extraction pipes of the ventilation system in order to ensure continuity of the fire separation.

The limitation device 10 is installed inside the confinement enclosure 2 and outside the storage cell 4. This limitation device can be fixed to a supporting partition, which is the top partition 43 of the storage cell 4. According to one possibility of implementation, several limitation devices may be associated in parallel in order to increase the treatment capacity.

An example of a device 10 for limiting the consequences of a fire as implemented according to the invention will now be described in relation to FIGS. 3A-3K (the device being shown in exploded view in FIG. 3K).

The various elements constituting the limitation device 10 can be produced for example from stainless steel.

The limitation device 10 comprises a reservoir 28 intended to contain a liquid 26, such as for example water.

The reservoir 28 provided with a vessel 29 comprises side walls 34, and a bottom 32 also referred to as the bottom wall 32.

Figure 3A:
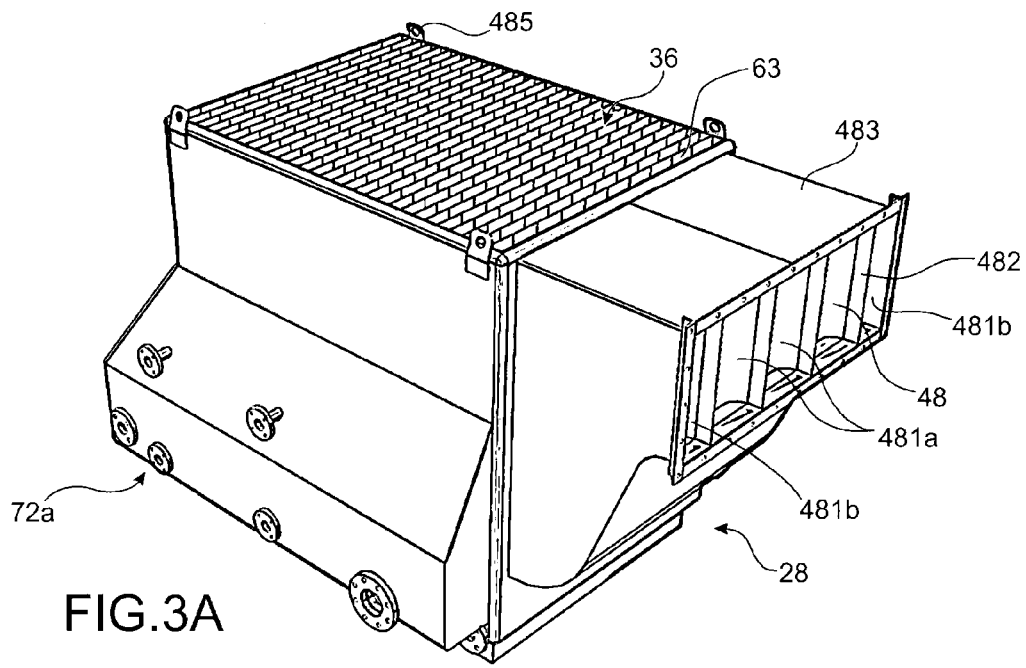
Figure 3B:
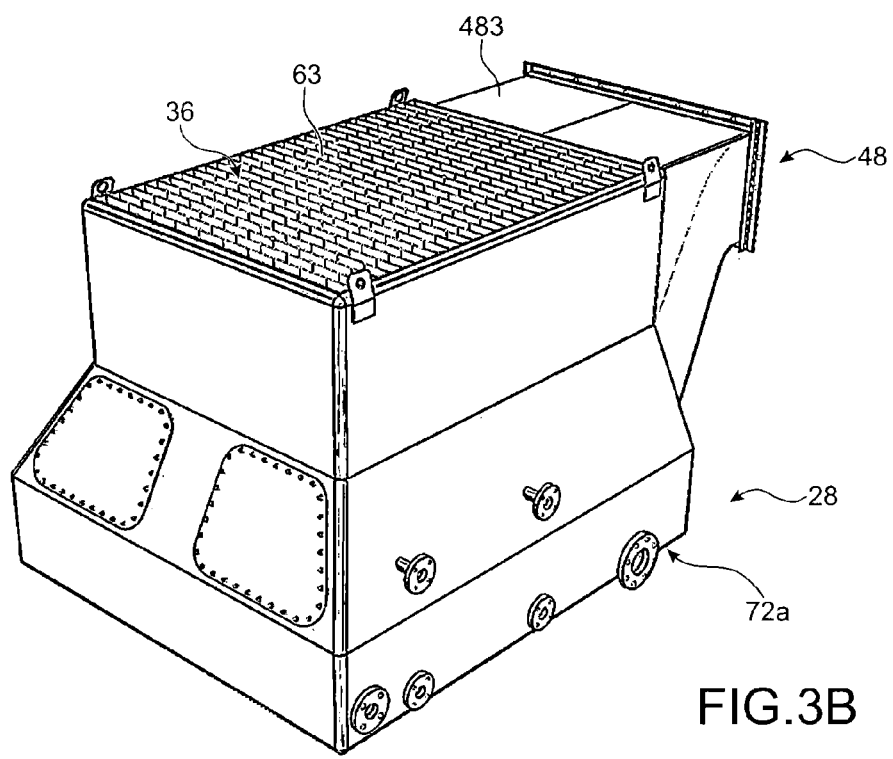
Figure 3C:
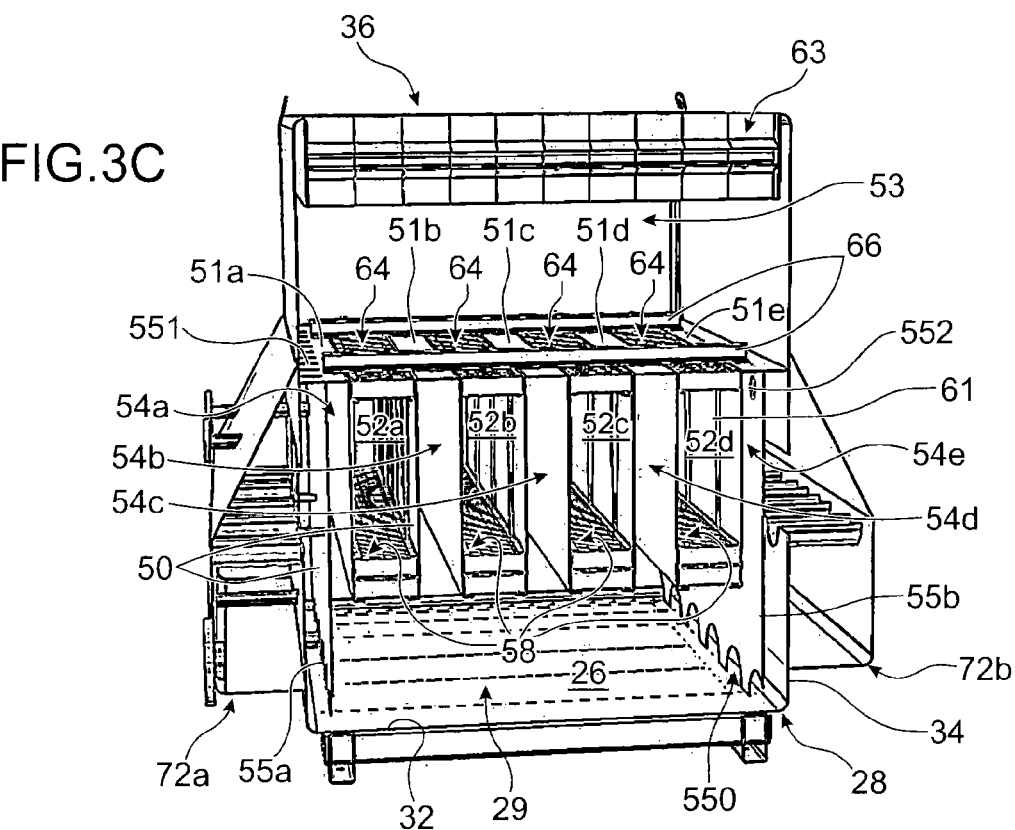

One or more openings 36 are situated on the top part of the reservoir 28, opposite to the bottom wall 32, the openings 36 being in communication with the confinement enclosure 2 (FIGS. 3A, 3B, 3C).

A connection pipe (the pipe not being shown in FIGS. 3A-3K) provides exchanges of gas between the storage cell 4 and the reservoir 28 of the limitation device 10.

Thus one end of the connection pipe emerges in the storage cell 4 while the other end of the connecting pipe is connected to an inlet pipe 48 of the reservoir 28 consisting of a plurality of inlet orifices 481a, 481b. The inlet pipe 48 can comprises central inlet orifices 481a with a given cross section and other inlet orifices 481b situated at the ends, on either side of the central orifices 481a, and with a smaller cross section, for example around a ratio of 1/2, with respect to the central inlet orifices 481a. This may balance the distribution of the flows.

The inlet orifices 481a, 481b may have a rectangular shape and be separated from one another by deflectors 482, designed to form means of guiding the gases or fumes liable to come in the inlet pipe 48. In the example illustrated, the inlet pipe 48 has a splayed shape so as to limit pressure drops and is integrated in a metal cladding 483 (FIGS. 3A, 3E, 3F, 3H, 3I, 3K).

The reservoir 28 comprises one or more chambers 54a, 54b, 54c, 54d, 54e, which will be referred to as "internal chambers", which are in communication with the storage cell 4 by means of the inlet pipes 48 and the connection pipe.

The reservoir 28 also comprises one or more chambers 52a, 52b, 52c, 52d referred to as "bubbling chambers", which are in communication with a chamber referred to as a "retardation" chamber 53, itself in communication with the confinement enclosure 2 by means of the openings 36 in the reservoir 28.

The device may comprise for example four bubbling chambers 52a, 52b, 52c, 52d, and five internal chambers 54a, 54b, 54c, 54d, 54e distributed on either side of the bubbling chambers (FIGS. 3C, 3D, 3F, 3K).

The reservoir 28 comprises lateral separation elements 50 between the internal elements 54a, 54b, 54c, 54d, 54e and the bubbling chambers 52a, 52b, 52c, 52d, which are in the form of plates extending in a direction orthogonal to the bottom wall 32 of the reservoir 28. The separation elements 50 are immersed in normal operation, in the liquid 26, without reaching the bottom wall 32 of the reservoir 28.

Among all the internal chambers, those 54b, 54c, 54d situated respectively between the bubbling chambers 52a, 52b, 52c, 52d, are delimited laterally on each side by the separation elements 50.

Figure 3D:
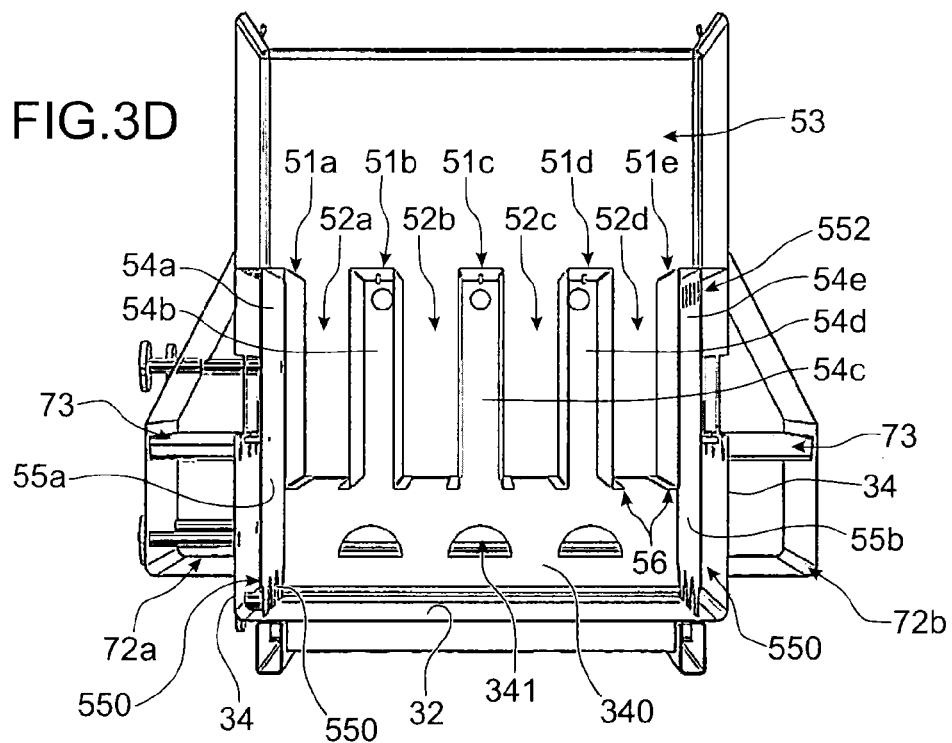

The other internal chambers 54a, 54e, situated on either side of all the bubbling chambers 52a, 52b, 52c, 52d, are for their part each delimited by a separation element 50 and a plate 55a, 55b forming a partition, which extends in a direction orthogonal to the bottom wall 32 of the reservoir 28. The plates 55a, 55b forming a partition have a height greater than that of the separation elements 50 and are also immersed, in normal operation, in the liquid 26. The plates 55a, 55b forming a partition may optionally reach the bottom wall 32 of the reservoir 28 (FIGS. 3C, 3D). The ends of the plates 55a, 55b forming a partition situated close to the bottom wall 32 may comprise openings 550 in the form of an arc of a circle, designed to allow the liquid 26 to pass while enabling the plates 55a, 55b to keep good rigidity.

Other plates 51a, 51b, 51c, 51d, 51e situated at the top part of the reservoir 28, in the same plane and parallel to the bottom wall 32 of the latter for their part delimit the top or the upper part of the internal chambers 54a, 54b, 54c, 54d, 54e.

The retardation chamber 53, situated at the top part of the reservoir 28, is for its part delimited on each side by the side walls 34 of the reservoir 28, as well as by the plates 51a, 51b, 51c, 51d, 51e.

The retardation chamber 53 is provided with a larger cross section than that of the bubbling chambers 52a, 52b, 52c, 52d (FIG. 3C).

As illustrated in FIG. 3C, each separation element 50 of the reservoir 28 can be attached at its top end to one of the plates 51a, 51b, 51c, 51d, 51e, and at its bottom end to a plate 56 referred to as a "wave breaker", which is immersed in the liquid 26 in normal operation of the limitation device 10.

The wave-breaker plates 56 extend toward the inside of the bubbling chambers 52a, 52b, 52c, 52d in a direction that may be parallel to that of the bottom 32 of the reservoir.

The arrangement of the inlet pipes 48 is such that a gaseous flow arriving in these inlet pipes 48 is guided under the wave-breaker plates 56.

In the limitation device according to the invention, the developed length of the wave-breaker 56 corresponds to the total of all the lengths L of the bubbling chambers 52a, 52b, 52c, 52d, that is to say 8 L, for example around 12 meters. Such a bubbling length can make it possible to treat a large gas flow for example of around 20,000 m$^3$/h, by obliging the air to pass through the water.

Figure 1:
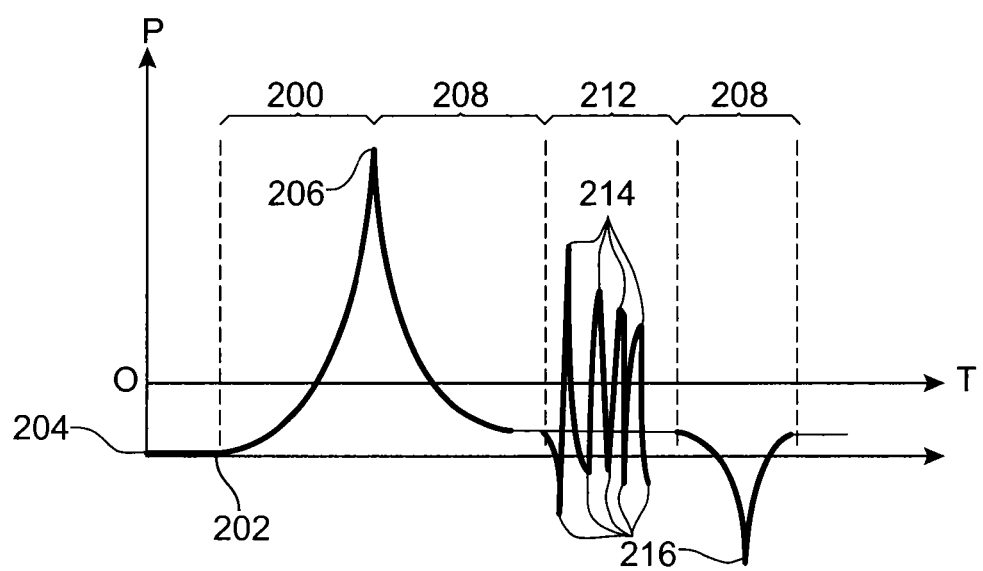
FIG. 1, already described, shows the theoretical pressure curve of a widespread uncontrolled fire in a storage cell containing dangerous materials.

The limitation device 10 also comprises devices for breaking up bubbles 58, intended to break up the gas bubbles into smaller bubbles, in order to increase to a maximum extend the exchange surface between the gas and liquid 26, during a phase of development of a fire 200 as described previously in relation to FIG. 1.

The devices for breaking up bubbles 58 (FIG. 3C, the devices for breaking up bubbles 58 not being shown in FIG. 3D) promote the thermal exchange between the gases and the liquid 26, and also provide a compromise between the limitation of the pressure drops and the non-coalescence of the bubbles.

Each device for breaking up bubbles 58 is placed in the bottom part of a bubbling chamber 52a, 52b, 52c, 52d and rests on the wave-breaker plates 56 of a bubbling chamber 52a, 52b, 52c, 52d. In normal operation, the devices for breaking up bubbles 58 are immersed in the liquid 26 of the limitation device 10. Each device for breaking up bubbles 58 can be formed for example from a superimposition of layers of meshed metal wires, each layer being interposed between holding grilles.

The limitation device 10 can also comprise anti-splatter devices 64 that are intended to limit the splattering of liquid 26 when the gases escape from the room 4 (FIG. 3C, the anti-splatter devices 64 not being shown in FIG. 3D). Each anti-splatter device 64 is placed at the top part of a bubbling chamber 52a, 52b, 52c, 52d and may be formed for example from a layer of meshed metal wires, said layer being interposed between two holding grilles. The bubbling chambers and the anti-splatter devices 64 are assembled in the form of baskets and are held by crossmembers 66 resting on the plates 51a, 51b, 51c, 51d, 51e.

According to one possibility of implementation, each anti-splatter device 64 may be secured to a device for breaking up bubbles 58 that is situated in the same bubbling chamber, by means of the baskets and holding rods 61 (FIG. 3C).

These holding rods 61 allow a simultaneous mounting of the anti-splatter devices 64 and devices for breaking up bubbles 58 in the bubbling chambers 52a, 52b, 52c, 52d.

The anti-splatter devices 64 are situated at the inlet to the retardation chamber 53, while at the outlet from the latter there is a droplet catcher device 63 placed on the top part of the reservoir 28. The droplet catcher 63 is designed to effect a separation of the liquid particles in suspension in a gaseous flow issuing from the latter. Such a droplet catcher 63 limits the splashing of liquid outside the reservoir (FIGS. 3A-3C, the reservoir being shown without the droplet catcher in FIGS. 3D, 3E, 3I, 3K). The openings communicating with the confinement enclosure 2 are situated at the outlet from the droplet catcher 63.

Close to the inlet to the retardation chamber 53 and the outlet from the bubbling chambers 52a, 52b, 52c, 52d, 52e there are orifices 551 for recovering liquid 26 provided in a plate 51a.

The reservoir 28 also comprises a chamber 82 for regulating the liquid levels, the functioning of which will be described later, and which is separated from the bubbling chambers 52a, 52b, 52c, 52d and the internal chambers 54a, 54b, 54c, 54d, 54e by a wall 340 (the regulation chamber 82 not being shown in FIG. 3I).

The wall 340 is perforated and comprises openings 341 allowing the liquid 26 contained in the reservoir 28 to pass.

In the limitation device according to the invention, overflow tanks 72a, 72b integrated in the reservoir 28 are provided on either side of the latter and communicate with the latter by means of openings 341 produced in the walls 34.

These overflow tanks 72a, 72b are provided for recovering liquid 26 when the level of the latter exceeds a certain predetermined threshold height in the reservoir 28. The tanks 72a, 72b in particular limit the pressure drop in operation of the device, the water height being directly related to a pressure difference.

This threshold height depends on a triggering threshold that it is wished to confer on the device. When a liquid overflow 26 is made to overflow at a threshold height defined so as to fix a threshold pressure value for liquid 26 in the vessel 29. The overflow tanks make the device reliable by fixing a triggering pressure threshold value whatever the flow of gas to be treated, and whatever the liquid level in the reservoir.

The overflow tanks 72a, 72b thus make it possible to trap the liquid 26, in particular in the case of malfunctioning of a liquid supply circuit 26. An excess of liquid 26 due to a leak in the liquid supply circuit can in fact be recovered by the overflow tanks 72a, 72b, and would not prevent the limitation device 10 from functioning since the triggering pressure level related to the height of liquid 26 would thus be preserved.

The overflow tanks 72a, 72b also make it possible to implement a system for regulating the liquid levels that is simplified compared with a limitation device according to the prior art and as described for example in the document FR 2 879 471.

The overflow tanks 72a, 72b can make it possible to discharge a large quantity of water in a little time, and for a very limited pressure drop, for example between 100 and 200 liters in less than 5 seconds with a pressure drop of 100 Pa.

Channels 73 are provided for pouring said liquid 26 into the tanks 72a, 72b. These channels 73 make it possible to obtain an increased overflow length and improve the ability of the device to absorb an abrupt variation in liquid level 26, for example due to a rapid increase in pressure in the storage cell.

Elements can be provided for facilitating the transportation of the reservoir 28. Rings 485 situated at the top corners of the reservoir can in particular be provided to accept means such as one or more slings in order to lift the reservoir 28.

Figure 3E:
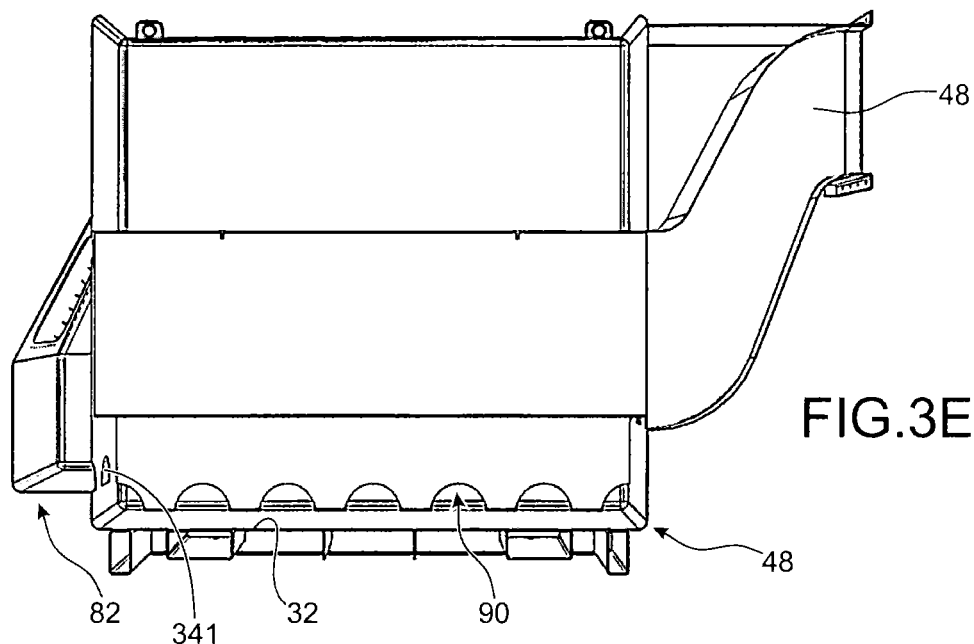
Figure 3F:
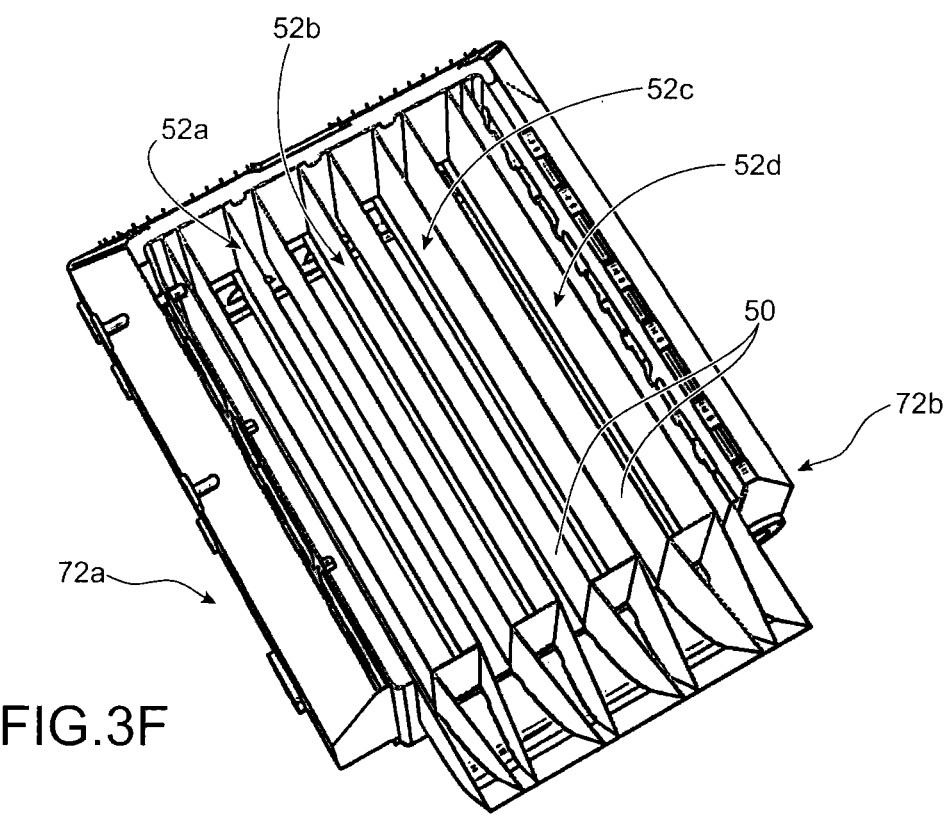
Figure 3G:
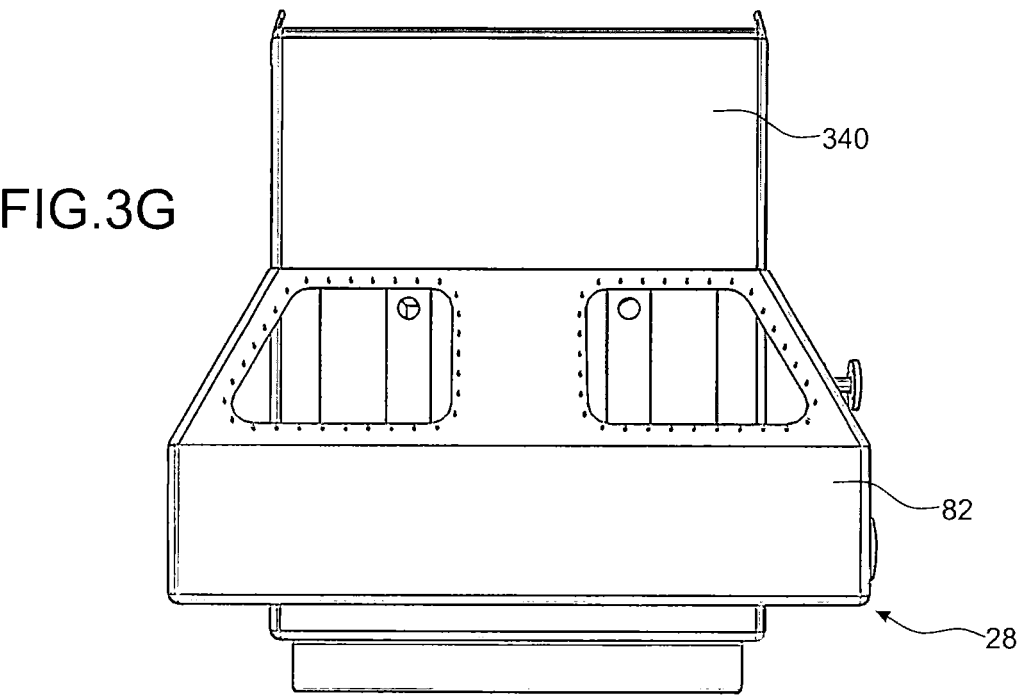
Figure 3H:
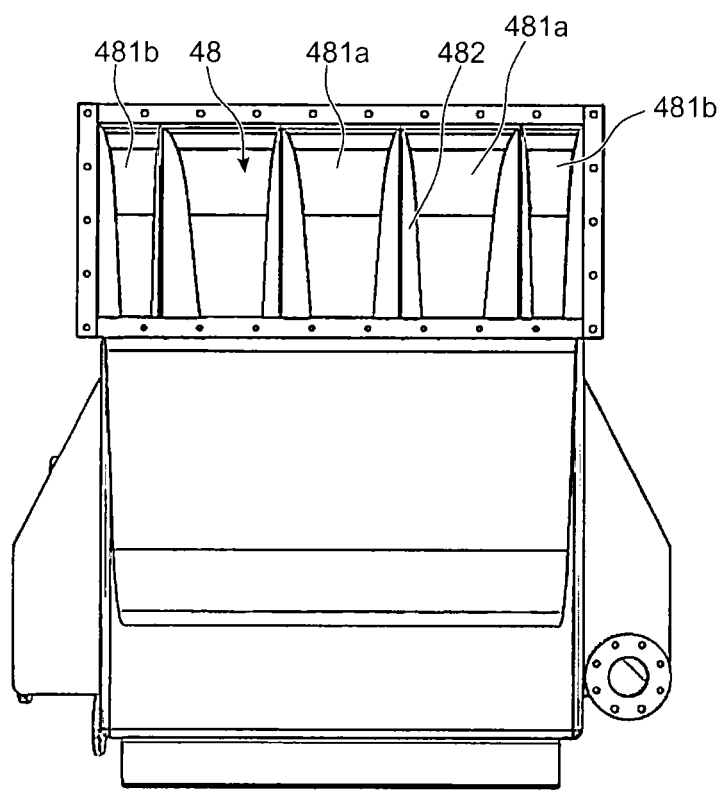
Figure 3I:
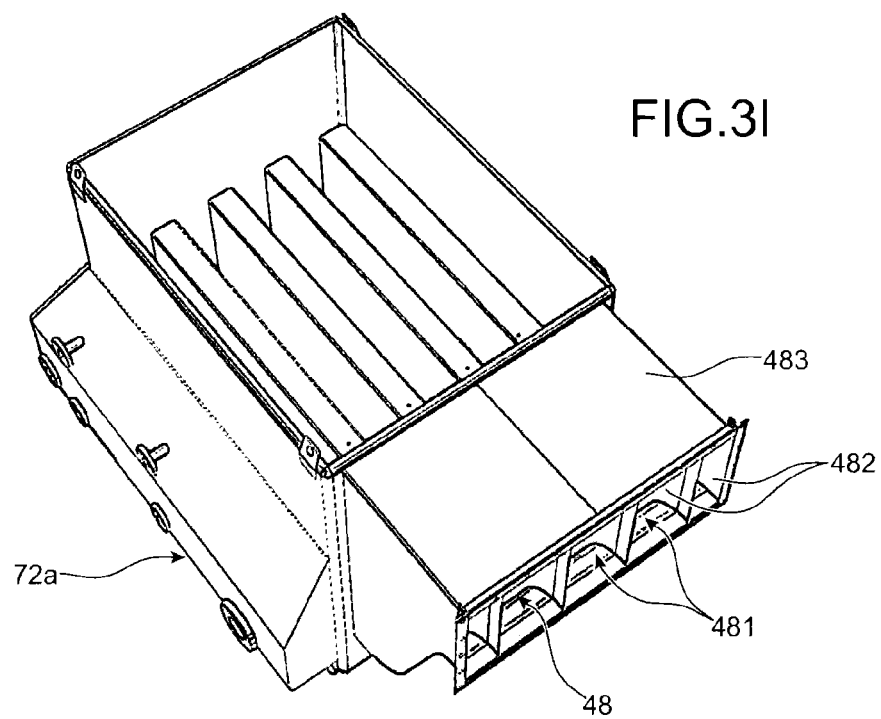

Openings 487 situated at the bottom corners of the reservoir can in particular be provided for receiving the forks of transport means such as a pallet truck in order to move the reservoir 28 (FIG. 3E, FIG. 3K).

Figure 3J:
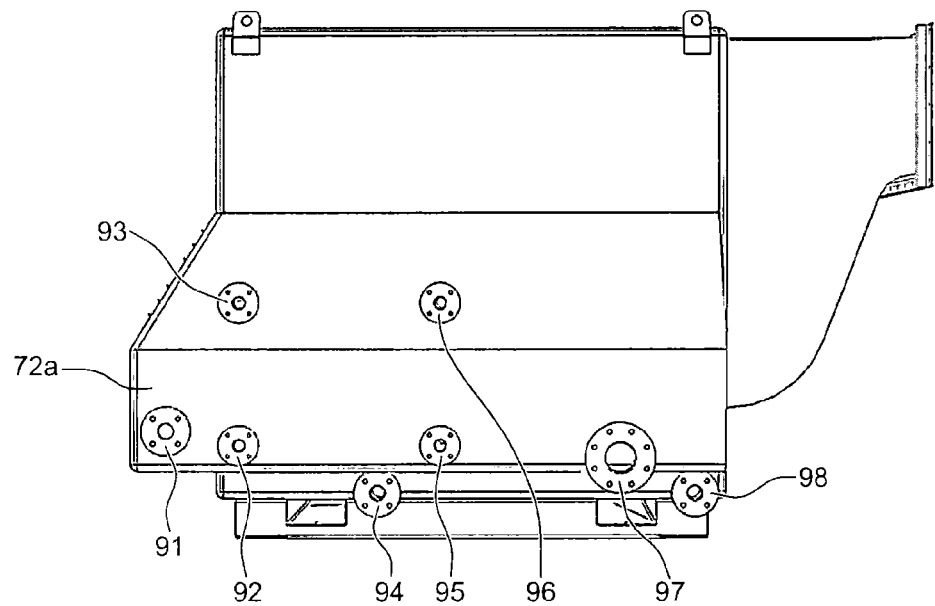
Figure 4F:
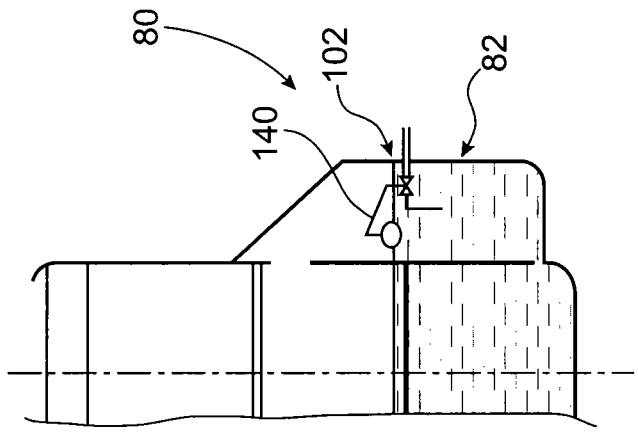
Figure 4E:
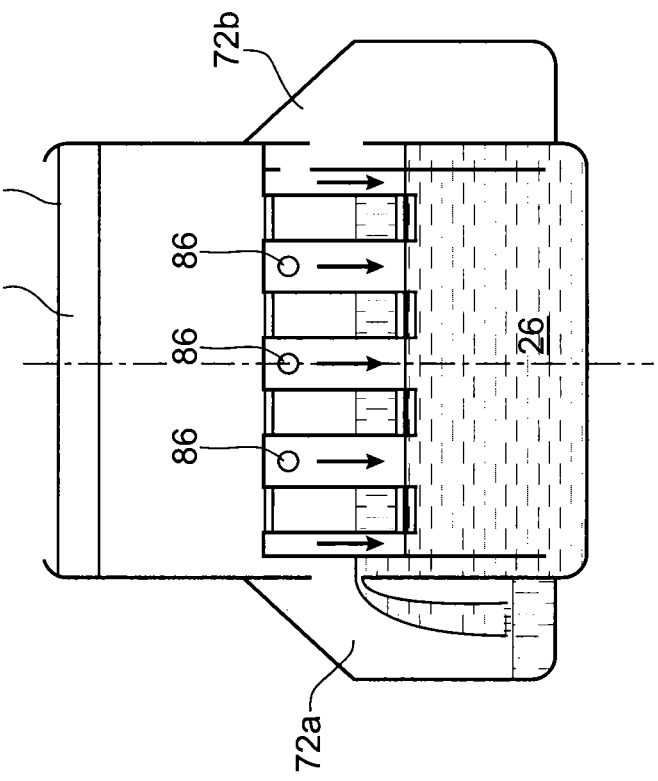
Figure 4J:
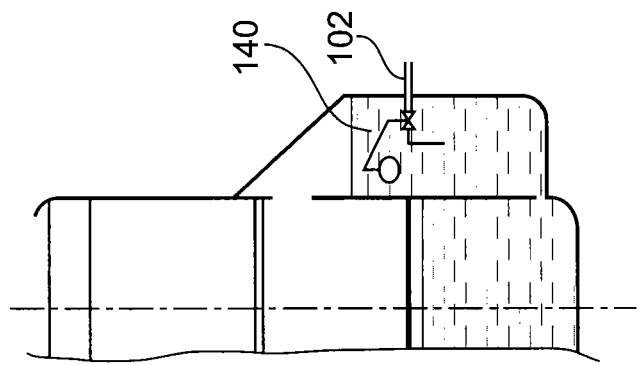
Figure 4I:
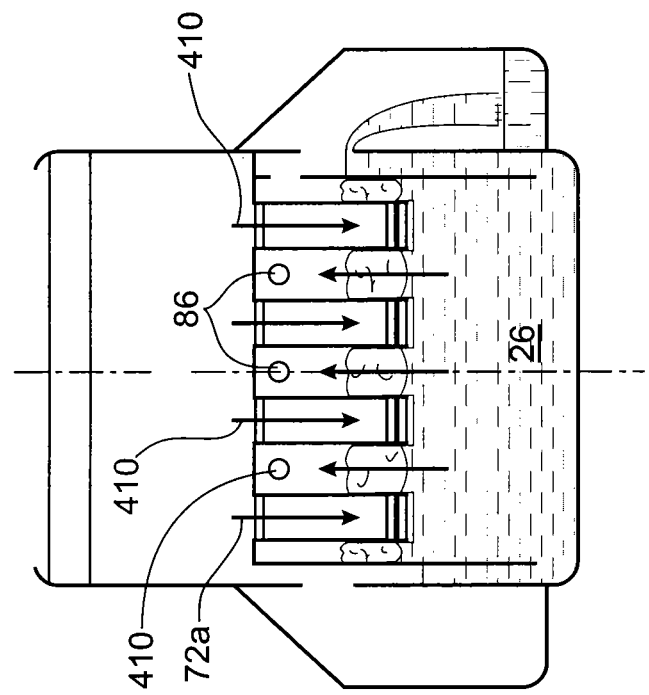

The reservoir can be provided with a plurality of flanges placed on the same side of the reservoir 28, including in particular a water inlet flange 91, bottom 92 and top 93 flanges between which a water column is placed in order to effect a display of level, bottom 95 and top 96 level measurement flanges, and flanges 97 for evacuating dry tanks (FIG. 3J).

The limitation device 10 also comprises a system for regulating the liquid levels 80 that makes it possible:
  to maintain, in normal operation, the level of liquid 26 in the reservoir 28, and
  to fill the reservoir 28 with liquid 26, when gases escape during the development phase of the fire 200, in order to compensate for the consumption of liquid 26, by evaporation or overflow into the tanks 72a, 72b, and thus to guarantee continuity of the thermal exchange between the gases and the liquid 26 in order to cool the combustion gases to a temperature below a threshold re-ignition temperature.

The system for regulating the liquid levels 80 is a mechanical system, which is shown schematically in FIGS. 4B, 4D, 4F, 4H, 4J.

The plates forming a partition 55a, 55b are situated at a distance from the inlet of the overflow tanks 72a, 72b, and establish a separation between the inlets of the tanks 72a, 72b and the internal chambers 54a, 54e. Orifices 552 are formed in the top part on the lateral face of the plate 55b, in particular to reintroduce liquid 26 and thus enable the overflow tanks to be pressurised (FIG. 3D).

The system for regulating the liquid levels 80 comprises a closed regulation compartment 82.

In the example illustrated in FIGS. 4A-4I, the regulation compartment 82 is up against the reservoir 28 and situated in areas that do not suffer boiling of the gases during the various operating phases of the limitation device 10, that is to say the exhaust (FIGS. 4G and 4H) and admission (FIGS. 4I and 4J) phases.

The regulation compartment 82 is separated from the bubbling chambers and the internal chambers by means of a wall, this wall being provided with communication orifices 86.

In the example illustrated in FIGS. 4A-4I, the regulation compartment 82 is at the same pressure as the storage cell 4 by means of an aeration orifice 86 directly connected to the connection pipe 46, and is connected to the reservoir 28 by means of a communication orifice 341 situated at the bottom part of the common wall 340.

The compartment for regulation of the liquid levels 82 also constitutes a liquid reserve 26. It is situated at a height with respect to the limitation device 10 so as enable it to be drained at the same time as the device. The reserve supplies the casing with liquid 26, in the event of a drop in the level of liquid in the limitation device 10. Its capacity is determined according to the power of the fire.

The system for regulating the liquid levels 80 also comprises a supply and discharge circuit that comprises: a tube 102 for supplying liquid 26, the filling tube 118 supplying the regulation compartment 82, by means of a float valve 140.

The role of the various elements of the system for regulating the liquid levels 80 will be specified below.

The float valve 140, which is closed in normal operation, is situated in the regulation compartment 82 connected to the internal chamber 54; the positioning of this float valve 140 in the regulation compartment 82 defines the quantity of liquid 26 that is situated in the limitation device 10.

The functioning of the limitation device 10 will now be described with reference to FIGS. 4C, 4E, 4G, 4I on the one hand, which show the reservoir with its overflow tanks 72a, 72b and the internal and bubbling chambers in longitudinal vertical section, in the respective situations of equilibrium state, phase just before triggering, exhaust phase, and air inlet phase.

Likewise, FIGS. 4D, 4F, 4H, 4J show respectively the regulation compartment 82 in the respective situations of equilibrium state, phase just before triggering, triggering phase and admission phase.

In normal operation or "equilibrium state" (FIGS. 4C and 4D), the limitation device 10 guarantees the static confinement of the storage cell 4. This is because the presence of liquid 26 above the end of the separation elements 50 delimiting the bubbling chambers and internal chambers provides the sealing of the storage cell 4 at the limitation device 10.

In a fire situation the limitation device 10 described previously functions autonomously and passively as follows:

During the first phase 200 of the fire (FIGS. 4E and 4F), corresponding to the development of a widespread uncontrolled fire in the storage cell 4, the pressure and temperature increase very greatly therein. The internal chambers 54b, 54c, 54d of the reservoir 28 are in communication with the storage cell 4 on fire by means of the inlet pipe 48. Consequently the increase in the pressure pushes the liquid 26 in the internal chambers and causes it to bubble in the bubbling chambers and overflow into the overflow tank 72a.

The level of liquid 26 in the internal chambers 54a, 54b, 54c, 54d, 54e drops to the level of the wave-breaker plates 56 situated at the ends of the separation elements 50. When the pressure in the internal chambers 54a, 54b, 54c, 54d, 54e reaches the triggering pressure threshold p_ech (FIGS. 4G and 4H), the hot gases from the fire pass under the wave-breaker plates 56 and form large gas bubbles.

When they rise to the surface of the bubbling chambers 52a, 52b, 52c, 52d, the large gas bubbles are broken up into very small gas bubbles 300 by the bubble breaking devices 58. The small bubbles rise to the free surface of the water. The energy brought by the gas bubbles to the water causes a boiling that causes splashing of water (the gas bubbles being transformed into water droplets) that is stopped by the retardation chamber 53, the anti-splatter devices 64 and the droplet catcher 63. The level of liquid 26 in the regulation compartment 82 that regulates the internal chamber 54 drops and consequently the float valve 140 opens (FIG. 4H).

Consequently the system for regulating the liquid levels 80 is started up and the limitation device 10 is supplied with liquid 26.

The limitation device 10 is triggered autonomously and passively for a threshold pressure p_ech, less than the "safety pressure" $P_s$ of the confinement members of the storage cell 4.

The hot gases from the fire are cooled by bubbling in the bubbling chambers 52a, 52b, 52c, 52d to a temperature less than the threshold re-ignition temperature, thus preventing the propagation of the fire to the confinement enclosure 2.

The high rate of renewal of the ventilation of the confinement enclosure 2, relative to the volume of the cooled gases escaping from the limitation device 10, provides dilution of the gases. A system for ventilating the confinement enclosure 2 can provide the maintenance of the dynamic confinement and the treatment of the atmosphere of the confinement enclosure 2 by opposing in particular a last filtration barrier 16 before discharge to the external environment 8.

During the second phase 208 of the fire (FIGS. 4I and 4J), corresponding to a phase of extinction of the fire, the temperature and pressure decrease very greatly, the negative pressure thus created being able to reach several thousands of pascals. As soon as the storage cell 4 is under negative pressure, the internal chamber or chambers 54b, 54c, 54d and the regulation compartment 82 that regulates this internal chamber or chambers 54b, 54c, 54d, in communication with the storage cell 4, are also under negative pressure. As soon as the negative pressure in the internal chamber or chambers 54b, 54c, 54d reaches the threshold p_adm, the limitation device 10 functions completely reversibly.

Fresh air coming from the confinement enclosure 2 passes under the wave-breaker plates 56 of the bubbling chambers 52, and air bubbles form, which rise to the surface of the liquid 26 in the internal chamber 54 in order to be introduced into the storage cell 4 and thus limit the negative pressure in the storage cell 4 to a negative pressure less than the safety negative pressure: $-P_s$.

The levels of liquid 26 in the internal chamber 54 and the regulation compartment 82 in communication with this internal chamber 54 rise, the float valve 140 is closed, and consequently the liquid-supply system 80 is not triggered. The addition of fresh air to the seat of the fire may then cause re-inflammation, for which the limitation device 10 remains available and effective.

EXAMPLE EMBODIMENT

The various components of the limitation device 10 are normally sized on the basis of an envelope assessment of the maximum thermodynamic conditions of a widespread uncontrolled fire in a storage cell 4. This prior study makes it possible to determine the triggering pressure thresholds p-ech and p_adm of the limitation device 10 and the flow rate that has to escape through the limitation device 10 in order to maintain the pressure of the storage cell 4 at a pressure less than the "safety pressure" $P_s$ of the confinement members, that is to say the fire-stop shutters, the air lock doors and the partitions.

An example of sizing is provided below, considering a widespread fire with very slow kinetics, which may be the case for waste packaged in metal barrels.

safety pressure $P_s$ of the confinement members; +/−2100 Pa, volume of the confinement chamber 2: 15000 m³, volume of the storage cell: 3000 m³, rate of renewal of the ventilation: 2 volumes/h, triggering pressure the limitation device 10, 11, during the first phase 200 of development of the fire: +1200 Pa, triggering pressure for the limitation device 10, 11 during the admission phase: −1200 Pa, theoretical flow rate of the gases escaping from the storage cell 4: 20,000 m³/h.

The invention claimed is:

1. A device for limiting consequences of a fire in a room in which the fire occurs, comprising:
a reservoir including a vessel containing a liquid, the reservoir including one or more chambers having a first opening in communication with the vessel and a second opening in communication with the room and one or more other chambers having a third opening in communication with the vessel of the reservoir and a fourth opening in communication with an area external to the room such that a flow path is formed between the room and the area external to the room;
the reservoir further including at least a first overflow tank and at least a second overflow tank, both integral, placed on either side of the vessel and separate from the flow path, each tank being separated from the vessel by a sidewall of the vessel and communicating with the vessel by way of openings formed in said side wall such that each tank being configured to receive the liquid when the liquid exceeds a predetermined given height in the vessel, wherein the room being a storage cell installed in a confinement enclosure the other chambers being in communication with the confinement enclosure and including one or more bubbling chambers being separated from the chambers by separation elements arranged orthogonally, at a bottom of the reservoir, the separation elements including wave-breaker devices, formed by plates fixed on bottom ends of the separation elements and which are oriented towards an inside of at least one bubbling chamber.

2. A device according to claim 1, the bubbling chambers communicating with a retardation chamber situated in an upper part of the reservoir and communicating with the confinement enclosure by one or more openings.

3. A device according to claim 2, the retardation chamber including a droplet catcher.

4. A device according to claim 1, the bubbling chambers including a bubble splitting device.

5. A device according to claim 1, the bubbling chambers including an anti-splatter device.

6. A device according to claim 5, wherein the anti-splatter device is kept secured to the bubble splitting device by at least one basket and holding rods.

7. A device according to claim 1, further comprising:
separation walls situated on either side of all the bubbling chambers and chambers, each of the separation walls being immersed in the liquid and being situated between a chamber and an inlet of one of the overflow tanks.

8. A device according to claim 7, one of the walls comprising orifices in an upper part on a lateral face of a plate.

9. A device according to claim 1, further comprising:
a system for regulating liquid levels in the reservoir, the regulation system including a circuit for supplying the reservoir with liquid.

10. A device for limiting consequences of a fire in a room in which the fire occurs, comprising:
a reservoir including a vessel containing a liquid, the reservoir including one or more chambers having a first opening in communication with the vessel and a second opening in communication with the room and one or more other chambers having a third opening in communication with the vessel of the reservoir and a fourth opening in communication with an area external to the room such that a flow path is formed between the room and the area external to the room;
the reservoir further including at least a first overflow tank and at least a second overflow tank, both integral, placed on either side of the reservoir and separate from the flow path, each tank configured to receive the liquid when the liquid exceeds a predetermined given height in the vessel, wherein the room being a storage cell installed in a confinement enclosure, the other chambers being in communication with the confinement enclosure and including one or more bubbling chambers; and channels configured to pour the liquid into the overflow tanks when its level reaches the predetermined given height.

11. A device for limiting consequences of a fire in a room in which the fire occurs, comprising:
a reservoir including a vessel containing a liquid, the reservoir including one or more chambers having a first opening in communication with the vessel and a second opening in communication with the room and one or more other chambers having a third opening in communication with the vessel of the reservoir and a fourth opening in communication with an area external to the room such that a flow path is formed between the room and the area external to the room;
the reservoir further including at least a first overflow tank and at least a second overflow tank, both integral, placed on either side of the reservoir and separate from the flow path, each tank configured to receive the liquid when the liquid exceeds a predetermined given height in the vessel;
a system for regulating liquid levels in the reservoir, the regulation system including a circuit for supplying the reservoir with liquid, the regulation system including a float valve, an opening of the float valve supplying liquid to the reservoir.

12. A device according to claim 11, the supply of liquid being achieved by a forced supply independent of the regulation system.

* * * * *